Patented May 10, 1949

2,469,371

UNITED STATES PATENT OFFICE 2,469,371

PROCESS OF REACTING GLYCERIDE OILS

Ivor M. Colbeth, Maplewood, N. J., assignor to The Baker Castor Oil Company, Jersey City, N. J., a corporation of New Jersey No Drawing. Application August 14, 1946, Serial No. 690,598

18 Claims. (Cl. 260—22)

This invention relates to the treatment of glyceride oils to form partial esters of polyhydric alcohols therefrom. The partial esters may be utilized as such, or may be treated further, as part of a continuous process, for the production of resinous materials. Such partial esters are useful as ingredients of hydraulic fluids, as plasticizers for synthetic resins or cellulose ethers, and esters, as intermediates in the preparation of synthetic resins, and the like. Synthetic resins which are obtained by chemical treatment of the partial esters are particularly valuable as components of surface finishes, such as lacquers and varnishes, for the protection of metallic and other surfaces.

One of the objects of this invention is to provide an improved process for the production of partial esters of polyhydric alcohols from glyceride oils.

Another object of this invention is to provide a process for the preparation of resinous materials from glyceride oils, in which the preparation involves the formation of partial esters of polyhydric alcohols as an intermediate step.

Other objects and advantages of the invention will be apparent from the following description.

The products of the first phase of this invention are partially esterified esters of polyhydric alcohols and higher fatty acids. According to the process of this invention, these esters are prepared by the interaction of a glyceride oil with methyl alcohol in the presence of an esterification catalyst, preferably alkaline in character. However, acid catalysts may be used with satisfactory results. Subsequently, a polyhydric alcohol is added to this reaction mixture, and, during the resulting alcoholysis, substantially all of the methyl alcohol originally present is removed by distillation.

It is desirable that the glyceride oils used in the process of this invention be substantially neutral, and this condition can be attained by any of the methods known to the prior art. When the oil used has a high acid value, an alkaline catalyst will not be effective. If the free fatty acid content of the oil is 0.2% or lower, the esterification reactions proceed satisfactorily. When the free fatty acid content of the oil is about 0.5% or higher, the esterification reactions are slow, and a product having a high acid value results.

Any glyceride oil may be treated in the manner indicated. Such oils include animal oils, fish oils, such as sardine and cod liver oils, and vegetable oils, such as soyabean, dehydrated castor, tung, oiticica, linseed, rapeseed, and like oils.

In the first stage of the reaction, the molar ratio of methyl alcohol to glyceride oil should be at least about six to one. Best results are obtained when this ratio is between about 7.5 to 1 and about 9 to 1. When the reactants are present in these ratios, the reaction proceeds rapidly, even at the relatively low temperatures at which it is preferred to carry out this stage of the reaction. Thus, temperatures in the range from about 15° to about 50° C. are suitable.

Preferred catalysts for this reaction are alkaline in nature. They include such alkaline materials as the alkali metal and alkaline earth metal hydroxides and alcoholates such as the hydroxides of lithium, sodium, potassium, calcium, and magnesium, and the alcoholates of these and other metals of these two groups, such alcoholates as the methylates, ethylates, and propylates being particularly useful. In addition to the preceding alkaline materials, another group of alkaline catalysts is the organic bases having dissociation constants substantially equivalent to those of said hydroxides and alcoholates. Quaternary ammonium hydroxides are representative of the strong organic bases. Typical quaternary ammonium hydroxides are phenyl trimethyl ammonium hydroxide, benzyl triethyl-ammonium hydroxide, and the like. The amount of alkaline catalyst required to effect the desired reaction is in the range from about 0.1 to about 0.5% by weight, based on the amount of glyceride used.

The time required for the reaction between the glyceride oil and the methyl alcohol varies, depending upon the exact conditions used, from about 5 to about 30 minutes. Toward the end of the reaction period, a polyhydric alcohol is added, either gradually or rapidly.

Typical polyhydric alcohols which may be used are glycerol, pentaerythritol, mannitol, and propylene glycol. The amount of polyhydric alcohol to be added will vary, depending on the number of hydroxyl groups per molecule of the polyhydric alcohol and on the degree of esterification to be effected. Thus, if glycerol is the polyhydric alcohol added, and it is desired to prepare a mono-glyceride, about two moles of glycerol would have to be added. Similar molar ratios can be worked out for other desired combinations of polyhydric alcohols and degree of esterification.

With the addition of a polyhydric alcohol, the temperature is increased to about 65°—95° C. During the reaction at this increased temperature, methyl alcohol distills from the reaction mixture. This methyl alcohol is recovered and may be re-cycled. The reaction is continued until substantially all of the methyl alcohol originally present is recovered. This amount includes the unreacted, excess methyl alcohol and that which entered into the alcoholysis reaction with the glyceride oil; the methyl alcohol which took part in the alcoholysis reaction is replaced from the resulting esters by the polyhydric alcohol added at the start of the second step of the reaction.

The preparation of the partially esterified esters of polyhydric alcohols and higher fatty acids is completed by the neutralization of the alkaline catalyst. This can be readily effected by the addition of a small calculated amount of mineral acid. The partial esters are then ready for use as such, or may be further treated according to the second phase of this invention. If the partial esters are to be treated further, the catalyst need not be neutralized, but may be utilized as such in succeeding reaction steps. As regards excess polyhydric alcohol present in the product consisting largely of partial esters, such alcohol may either be removed, or its concentration may be adjusted to any convenient figure.

According to the further process of this invention, resinous materials are prepared by the reaction of partially esterified esters, prepared according to the preceding steps, with a polybasic carboxylic acid or anhydride. Thus, the partially esterified esters may be treated with an acidic compound in the same reactor in which they were prepared, or, if a continuous process is being used, the partially esterified esters, after the removal of substantially all of the methyl alcohol by distillation, are transferred to the next reactor in the series, where they are contacted with the polybasic carboxylic compound.

Typical polybasic carboxylic compounds which may be used in the preparation of resinous materials from the partially esterified esters are maleic acid, fumaric acid, sebacic acid, azelaic acid, malic acid, ketomalic acid, citric acid, phthalic acid or anhydride, hemimellitic acid, and the like. The amount of polybasic carboxylic compound to be used can be calculated in any particular case on the basis of supplying sufficient carboxyl groups to react with the available hydroxyl groups in the partially esterified esters. The actual amount of polybasic carboxylic compounds to be used need not correspond exactly with the stoichiometric amount, but can vary over a fairly wide range, depending on the properties desired in the final resinous material. Thus, in the case where the partially esterified esters are the esters of a trihydric alcohol, the molar ratio of this alcohol to a dibasic carboxylic compound may vary from about 0.9 to 1 to about 1.5 to 1.

The reaction with the polybasic carboxylic compound is preferably carried out in the temperature range from about 200° to about 300° C. The reaction is continued at a temperature in this range until a resin having the desired properties is obtained. This time can be determined experimentally in any particular case by making one or two test runs. In general, resins having properties which make them very useful constituents of surface coatings are obtained by continuing this reaction for about one to about four hours.

A resin with improved color and lowered acid number is obtained if an inert gas is used as a blanketing atmosphere during the reaction and during the cooling period following the reaction. A gas such as nitrogen or carbon dioxide may be used, and it may either be passed over the surface of the reaction mixture or bubbled through it.

The resins obtained are clear, viscous to solid, pale yellow to brown materials, which are readily soluble in the usual coating solvents and in drying and non-drying oils.

The following examples are given to illustrate the invention, but it is to be understood that the invention is not limited to these examples.

*Example 1.*—440 parts by weight of substantially neutral dehydrated castor oil are introduced into a reactor together with 120 parts of methyl alcohol. The catalyst, which is 0.65 part of sodium hydroxide, is introduced into the reactor in solution in the methyl alcohol. The reaction is allowed to proceed for thirty minutes at a temperature between 20° and 30° C. Agitation is provided to afford better contacting of the reactants.

At the end of the indicated reaction period, 90 parts of glycerol in an equal weight of methyl alcohol are added gradually, the temperature being increased to 90° C. The addition of the alcohol at this point aids in the removal of any water that might be present. The apparatus is provided with a short column and a condenser, so that the methyl alcohol which distills from the reaction mixture during this period can be recovered. The methyl alcohol separation from the reaction mixture is substantially complete in about one hour. At the end of this time, the mono-glyceride of the dehydrated castor oil acids is allowed to cool, and is then neutralized to a pH of 6-7 by the addition of a small amount of surfuric acid.

This mono-glyceride is useful as a constituent of hydraulic fluids, as a plasticizer for synthetic plastics, and the like, and also as an intermediate in reactions involving its unesterified hydroxyl groups.

*Example 2.*—220 parts by weight of substantially neutral soyabean oil are charged to a reactor, together with 70 parts of methyl alcohol containing 0.65 part of phenyltrimethyl ammonium hydroxide. The reaction is allowed to proceed for a period of twenty minutes at a temperature of 30°–40° C. Agitation is used to promote the reaction.

At the end of this period, 50 parts of pentaerythritol are added to the reaction mixture, and the temperature of the mixture is increased to 95° C. The methyl alcohol distills from the mixture, and is condensed and recovered. The methyl alcohol removal is substantially complete in about fifty minutes. The distillation residue is allowed to cool, and is neutralized to a pH of 6-7 by adding the appropriate amount of phosphoric acid. The resulting partial esters of soyabean oil acids with glycerol and pentaerythritol are useful for the same purposes as indicated for the monoglyceride in Example 1.

*Example 3.*—440 parts by weight of substantially neutral linseed oil are mixed with 130 parts of methyl alcohol containing 0.9 part of sodium methylate. The mixture is agitated, and, after ten minutes at 15–25° C., 75 parts of propylene glycol are added. The temperature is then increased to about 85° C. After 90 minutes, the distillation residue is cooled, and neutralized by the addition of the appropriate small amount of sulfuric acid.

*Example 4.*—185 parts of phthalic anhydride are added to the uncooled product from Example 1. The temperature is increased to 230° C., and then gradually increased further to 255° C. Heating in this temperature range is continued for three hours, the reaction mixture being blanketed with nitrogen during this reaction period and the subsequent cooling step. The resin obtained is pale yellow in color, and is a highly valuable constituent of surface coatings.

*Example 5.*—185 parts of sebacic acid are added to the uncooled product from Example 2. The temperature is increased to 270° C., and then gradually increased further to 280° C. The reaction mixture is maintained under a blanket of nitrogen during the heating and subsequent cooling. The heating in the indicated temperature range is continued for 3.5 hours. The product of this reaction is a light-colored clear resin, which is useful as a modifying ingredient of surface finishes.

*Example 6.*—80 parts by weight of maleic acid are added to the uncooled product from Example 3. The temperature is increased to 200° C., and then gradually increased to 220° C. over a period of two and one-quarter hours. The reaction mixture is blankered with nitrogen during the heating and the subsequent cooling period. The product of this reaction is a useful, light colored resin.

*Example 7.*—440 parts by weight of tung oil are mixed with 110 parts of methyl alcohol containing 0.9 part of calcium hydroxide. This mixture is agitated, and maintained at a temperature of 30°–40° C. for a period of about 30 minutes. At the end of this period, 70 parts by weight of glycerol are added gradually, the temperature being increased to about 95° C. After one hour, substantially all of the methyl alcohol has been distilled from the mixture and recovered.

135 parts of aconitic acid are added to the hot partial ester of glycerol and tung oil acids. The temperature is increased to 250° C., and then gradually increased further to 275° C. over a period of 3 hours and afterwards cooled. The reaction mixture is blanketed with nitrogen during this heating and the subsequent cooling period. The product of this reaction is a light-colored, valuable resin.

*Example 8.*—80 parts of maleic anhydride are added to the uncooled partial ester obtained in Example 2. The temperature is increased to 230° C., and then gradually increased further to 255° C. over a period of two and one-half hours and afterwards cooled. The reaction zone is maintained under a nitrogen atmosphere during the heating and subsequent cooling period. The product of this reaction is a light-colored, valuable resin.

The reactions described herein may be carried out either in a batch or continuously. Also these reactions may be carried out under reduced or increased pressures, the reaction temperatures for the several steps in the over-all reaction being adjusted to suit the particular pressures used.

What is claimed is:

1. A process for the preparation of partial esters of polyhydric alcohols and higher fatty acids, which comprises the steps of (1) reacting a substantially neutral fatty oil with methyl alcohol in the presence of an esterification catalyst at a temperature in the range from about 15° C. to about 50° C. until the ester interchange reaction is substantially completed and the fatty oil is substantially converted to methyl esters of the fatty acids of said fatty oil, the quantity of methyl alcohol being at least 6 moles for each mole of triglyceride present in said oil, (2) further reacting the thus formed mixture of glycerine and methyl esters of fatty acids with added polyhydric alcohol by heating the entire reaction mixture between about 65° C. and about 95° C. until the methyl esters of the fatty acids are converted to partial esters of the polyhydric alcohol component present and the free methyl alcohol is distilled off, and (3) recovering the partial ester of the polyhydric alcohols.

2. The process of claim 1, in which the molar ratio of methyl alcohol to glyceride oil is between about 7.5 to 1 and about 9 to 1.

3. The process of claim 1, in which said glyceride oil is an animal oil.

4. The process of claim 1, in which said glyceride oil is a fish oil.

5. The process of claim 1, in which said glyceride oil is a vegetable oil.

6. The process of claim 1, in which said glyceride oil is an unsaturated vegetable oil.

7. The process of claim 1, in which said glyceride oil is soyabean oil.

8. The process of claim 1, in which said glyceride oil is a drying vegetable oil.

9. The process of claim 1, in which said glyceride oil is dehydrated castor oil.

10. The process of claim 1, in which said glyceride oil is linseed oil.

11. The process of claim 1, in which said esterification catalyst is used in an amount of about 0.1% to about 0.5% by weight, based on the amount of glyceride oil present.

12. The process of claim 1, in which said esterification catalyst is selected from the group consisting of alkali metal and alkaline earth metal hydroxides and alcoholates, and organic bases having dissociation constants substantially equivalent to those of said hydroxides and alcoholates.

13. The process of claim 1, in which the polyhydric alcohol is added to the reaction mixture after a reaction period of about 5 to about 30 minutes.

14. The process of claim 1, in which the molar ratio of polyhydric alcohol to glyceride oil is in the range from about 1 to 1 to about 2 to 1.

15. The process of claim 1, in which said polyhydric alcohol is glycerol.

16. The process of claim 1, in which said polyhydric alcohol is pentaerythritol.

17. The process of claim 1, in which said polyhydric alcohol is propylene glycol.

18. A process for the preparation of resinous mixed esters of monobasic and polybasic acids with polyhydric alcohols, useful as ingredients of protective and decorative coatings, which comprises the steps of (1) reacting a substantially neutral fatty oil with methyl alcohol in the presence of an esterification catalyst at a temperature in the range from about 15° C. to about 50° C. until the ester interchange reaction is substantially completed and the fatty oil is substantially converted to methyl esters of the fatty acids of said fatty oil, the quantity of methyl alcohol being at least 6 moles for each mole of triglyceride present in said oil, (2) further reacting the thus formed mixture of glycerine and methyl esters of fatty acids with added polyhydric alcohol by heating the entire reaction mixture between about 65° C. and about 95° C. until the methyl esters of the fatty acids are converted to partial esters of the polyhydric alcohol component present and the free methyl alcohol is distilled off, and (3) reacting the thus formed distillation residue with a compound selected from the class consisting of polycarboxylic acids and anhydrides thereof at temperatures ranging from about 200° C. to about 300° C. until the mixed ester formation is completed, the quantity of polycarboxylic compound used being substantially that amount needed to esterify the free hydroxyl groups of said distillation residue.

IVOR M. COLBETH.

REFERENCES CITED

The following references are of record in the file of this patent:

UNITED STATES PATENTS

| Number | Name | Date |
|---|---|---|
| 1,928,583 | Wecker | Sept. 26, 1933 |
| 2,044,747 | Ott et al. | June 16, 1936 |
| 2,063,854 | Rosenblum | Dec. 8, 1936 |
| 2,123,206 | Robinson | July 12, 1938 |
| 2,290,609 | Goss | July 21, 1942 |
| 2,383,596 | Dreger | Aug. 28, 1945 |